US010438523B2

(12) United States Patent
Kim et al.

(10) Patent No.: US 10,438,523 B2
(45) Date of Patent: *Oct. 8, 2019

(54) ELECTRONIC DISPLAY DEVICE AND INFORMATION DISPLAY METHOD OF SAME

(71) Applicant: DOT INCORPORATION, Seoul (KR)

(72) Inventors: Ju Yoon Kim, Gwangmyeong-si (KR); Ji Ho Kim, Incheon (KR); Hyeon Cheol Park, Gwangmyeong-si (KR)

(73) Assignee: DOT INCORPORATED, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,185

(22) Filed: Jan. 15, 2019

(65) Prior Publication Data

US 2019/0147779 A1 May 16, 2019

Related U.S. Application Data

(63) Continuation of application No. 15/971,682, filed on May 4, 2018, now Pat. No. 10,217,389, which is a continuation of application No. PCT/KR2016/012646, filed on Nov. 4, 2016.

(30) Foreign Application Priority Data

Nov. 4, 2015 (KR) ........................ 10-2015-0154764

(51) Int. Cl.
*G09G 3/00* (2006.01)
*G08B 6/00* (2006.01)
*G06K 9/62* (2006.01)
*G09F 7/00* (2006.01)

(52) U.S. Cl.
CPC ............... *G09G 3/003* (2013.01); *G06K 9/62* (2013.01); *G08B 6/00* (2013.01); *G09F 7/00* (2013.01); *G09G 2370/20* (2013.01)

(58) Field of Classification Search
CPC . G06K 9/62; G09F 7/00; G09G 3/003; G08B 6/00
See application file for complete search history.

(56) References Cited

U.S. PATENT DOCUMENTS

2012/0169765 A1 7/2012 Xu et al.
2013/0164717 A1 6/2013 Bourdon et al.
2014/0340298 A1 11/2014 Aldossary
2018/0254002 A1* 9/2018 Kim ........................ G06K 9/62

FOREIGN PATENT DOCUMENTS

JP 2013134724 A 7/2013
KR 1020150030039 A 3/2015
WO 2014027228 A2 2/2014

* cited by examiner

*Primary Examiner* — Abbas I Abdulselam
(74) *Attorney, Agent, or Firm* — Novick, Kim & Lee; Jae Youn Kim

(57) ABSTRACT

Provided are an electronic display device and an information display method of same, the electronic display device enabling recognition by means of a tactile sensation or three-dimensional visual recognition with respect to an object.

14 Claims, 7 Drawing Sheets

ELECTRONIC DISPLAY DEVICE AND INFORMATION DISPLAY METHOD OF SAME

CROSS-REFERENCES TO RELATED APPLICATIONS

This application is a continuation of U.S. application Ser. No. 15/971,682, filed May 4, 2018, which is a continuation of PCT/KR2016/012646, filed Nov. 4, 2016, which claims priority to and benefit of KR 10-2015-0154764, filed Nov. 4, 2015, of which disclosure is incorporated herein by reference by its entirety.

TECHNICAL FIELD

The present disclosure relates to an electronic display device and an information display method of the same.

BACKGROUND ART

Recently, various display devices, including information display devices, for displaying information to users have been used. Since these display devices are used in combination with various cameras, sensors, and the like, various information about things are automatically and/or manually provided to users.

However, all of these display devices are limited to a two-dimensional information display that provide a screen that may be perceived visually by all users, in particular, that allow may be recognized only due to light.

DESCRIPTION OF EMBODIMENTS

Technical Problem

Provided are an electronic display device capable of enabling a tactile recognition of an object or a three-dimensional visual recognition thereof and an information display method of the electronic display device.

Solution to Problem

According to an aspect of the present disclosure, an electronic display device includes a first recognition signal generating unit configured to generate a first recognition signal with respect to an object; a storage unit configured to store a plurality of display information; a display signal generating unit configured to generate a first display signal corresponding to each of the plurality of display information and a second display signal different from the first display signal; a comparing unit configured to compare the first recognition signal with the plurality of display information, and when the first recognition signal is same as one of the plurality of display information, to allow the display signal generating unit to generate a first display signal corresponding to the plurality of display information, and when the first recognition signal is not same as the plurality of display information, to allow the display signal generating unit to generate the second display signal; a display signal selecting unit configured to select the first display signal or the second display signal; a display unit including a protrusion unit and configured to generate a display via the protrusion unit in accordance with the first display signal or the second display signal; a driving unit connected to the protrusion unit and configured to drive the protrusion unit; and a drive determining unit electrically connected to the driving unit and configured to operate at least a part of the driving unit in accordance with the first display signal or the second display signal, wherein the protrusion unit includes at least one protrusion, wherein the driving unit includes at least one driving module connected to the at least one protrusion, and wherein the drive determining unit further includes a period determining unit configured to determine a projection period of the at least one protrusion.

The electronic display device may further include: a signal receiving unit electrically connected to the first recognition signal generating unit and configured to receive a second recognition signal transmitted from the object The first recognition signal generating unit may be configured to generate a first recognition signal corresponding to the second recognition signal.

The second display signal may be a new display signal corresponding to a first recognition signal which is not same as the plurality of pieces of display information.

The electronic display device may further include: a recognition determining unit electrically connected to the first recognition signal generating unit and configured to allow the first recognition signal generating unit to perform a recognition operation on the object.

The protrusion unit may include a plurality of protrusions separated from each other, the driving unit may include a plurality of driving modules individually connected to at least one of the plurality of protrusions, and the drive determining unit may further include a drive module selecting unit configured to operate at least one of the plurality of driving modules.

The drive determining unit may further include a height determining unit configured to determine a projection height of the at least one protrusion.

According to another aspect of the present disclosure, an information display method performed by an electronic display device may include generating a first recognition signal with respect to an object; comparing the first recognition signal with a plurality of display information; when the first recognition signal is same as one of the plurality of display information, generating a first display signal corresponding to the plurality of pieces of display information, and when the first recognition signal is not the same as the plurality of display information, generating a second display signal different from the first display signal; selecting the first display signal or the second display signal; and generating a display by driving a protrusion unit in accordance with the first display signal or the second display signal, wherein the protrusion unit includes at least one protrusion, wherein a display by the protrusion unit is determined according to a projection period of the at least one protrusion.

The information display method may further include: receiving a second recognition signal transmitted from the object.

The generating of the first recognition signal may include: generating a first recognition signal corresponding to the second recognition signal.

The second display signal may be a new display signal corresponding to a first recognition signal which is not same as the plurality of pieces of display information.

The information display method may further include: a recognition determining to perform a recognition operation on the object.

The protrusion unit may include a plurality of protrusions separated from each other, and a display by the protrusion unit may be determined according to projection patterns of the plurality of protrusions.

A display by the protrusion unit may be determined according to a projection height of the at least one protrusion.

Advantageous Effects of Disclosure

It is possible for a user to tactually recognize information perceived about an object through a projection display of a protrusion unit.

Furthermore, the protrusion display may provide the user with a new visual display by protrusion.

A first recognition signal capable of recognizing an object based on a second recognition signal transmitted from the object is generated, and thus the information about the object stored in the object may be accurately grasped.

The recognition of the object may be performed by a recognition decision of the user. Alternatively, when external and/or internal conditions satisfy or do not satisfy a predetermined condition, a recognition operation may be automatically performed on the object.

The user may tactually and/or visually perceive the display information of various patterns displayed by driving of some and/or all protrusions.

It is possible to display information distinguished in a plurality of cases, such as a case where the protrusion completely projects, a case where only the protrusion partially projects, and a case where the protrusion does not project.

Furthermore, even when one protrusion is provided, it is possible to display the information distinguished in a plurality of cases by adjusting a projection period and projecting the protrusion in a plurality of patterns.

DETAILED DESCRIPTION

Figure 1:
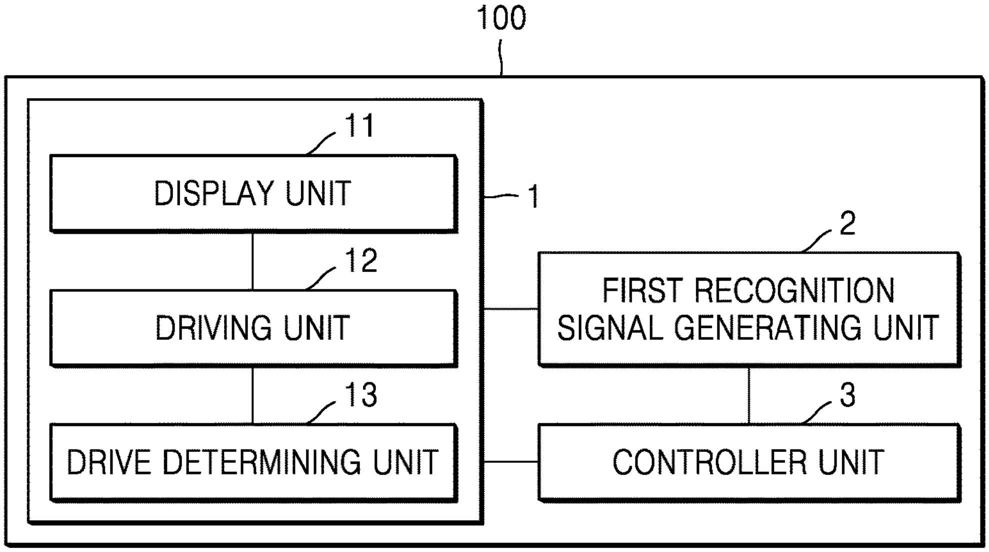
FIG. 1 is a block diagram schematically showing a configuration of an electronic display device according to an embodiment.

Embodiments may have various modifications, and thus specific embodiments are illustrated in the drawings and described in detail in the detailed description. The effects and features of the embodiments and how to accomplish them will be apparent with reference to the following detailed description together with the drawings. However, the embodiments are not limited to the embodiments disclosed below, but may be implemented in various forms.

Hereinafter, the embodiments will be described in detail with reference to the accompanying drawings, wherein like reference numerals refer to the same or corresponding components throughout the drawings, and a redundant description thereof will be omitted.

In the following embodiments, the terms first, second, and the like do not have limited meaning but are used for the purpose of distinguishing one element from another element.

In all the embodiments of the disclosure, a unit may mean a single component that executes a particular program, but is not necessarily limited thereto, and may be a partitioned region of at least one storage medium in which the program is stored.

In the following examples, the singular forms “a”, “an” and “the” include plural referents unless the context clearly dictates otherwise.

In the following examples, the term “comprising” or “having” is meant to imply the presence of a feature or element described in the specification and does not preclude the possibility that one or more other features or elements may be added.

In the drawings, elements may be exaggerated or reduced in size for convenience of explanation. For example, the sizes and thicknesses of the respective elements shown in the drawings are arbitrarily shown for convenience of explanation, and thus the following embodiments are not necessarily limited thereto.

FIG. 1 is a block diagram schematically showing a configuration of an electronic display device according to an embodiment.

Referring to FIG. 1, an electronic display device 100 according to an embodiment may include a display driving unit 1, a first recognition signal generating unit 2, and a controller unit 3. In the specification, the display driving unit 1 is shown as being separate from the controller unit 3 and the first recognition signal generating unit 2, but the disclosure is not necessarily limited thereto. The display driving unit 1 may be installed in a single body with the controller unit 3. Furthermore, the display driving unit 1 may be installed in a single body with the first recognition signal generating unit 2. These may be equally applicable to all the embodiments of the present specification.

The first recognition signal generating unit 2 may generate a first recognition signal with respect to an object. Various devices or modules capable of recognizing the object and generating the first recognition signal which is information about the object may be used. For example, an image sensing device, a frequency sensing device that recognizes an object emitting a specific frequency, an electric sensing device that senses a current, a temperature sensing device that senses a temperature, etc. may be applied.

The first recognition signal with respect to the object may be a signal including recognition information about the object itself as described above. For example, when the object includes an image code, the first recognition signal may be a recognition signal with respect to the image code. At this time, the first recognition signal generating unit 2 may include a scanner having an image code decoding function. The image code may include a bar code, a QR code, or other image code.

The controller unit 3 may be electrically connected to the first recognition signal generating unit 2 and electrically connected to a display driving unit 1 described later to receive signals from the first recognition signal generating unit 2 and/or the display driving unit 1 or to control the first recognition signal generating unit 2 and/or the display driving unit 1.

Figure 2:
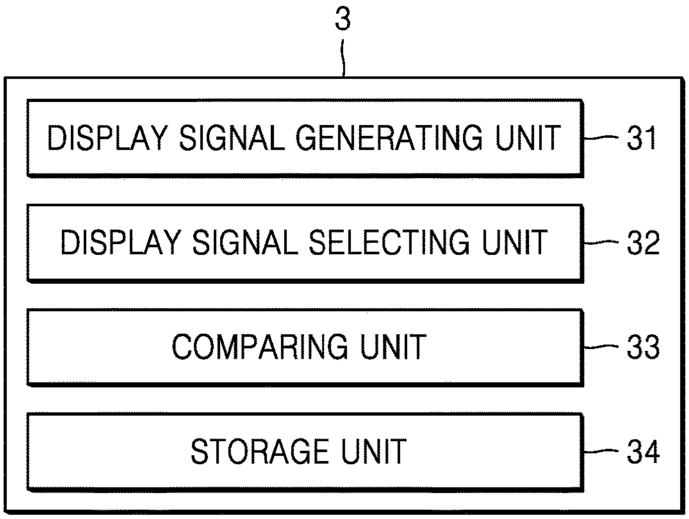
FIG. 2 is a block diagram schematically showing a configuration of a controller unit according to an embodiment.

The controller unit 3 may include a display signal generating unit 31, a display signal selecting unit 32, a comparing unit 33, and a storage unit 34, as may be seen in FIG. 2.

The storage unit 34 may store a plurality of display information. The display information may be various display information displayed through the display driving unit 1.

The display signal generating unit 31 may generate a first display signal and a second display signal corresponding to respective display information. The second display signal may be different from the first display signal. The first display signal and the second display signal may be signals that may be read by the display driving unit 1, and accordingly the display driving unit 1 may display specific information. Specifically, the first display signal is a display signal corresponding to the respective display information. The second display signal may be a display signal indicating that the first recognition signal is different from the display information in which is already stored. Therefore, the second display signal may correspond to a signal for indicating to the user a fact that the first recognition signal generating unit 2 of the electronic display device 100 recognizes the object is not previously stored information.

Alternatively, the second display signal may be a new display signal corresponding to the first recognition signal which is not the same as the display information. That is, when the information about the object recognized by the first recognition signal generating unit 2 is not the same as the previously stored display information, the second display signal may refer to the display signal corresponding to the first recognition signal indicating new information about the object.

The descriptions of the first display signal and the second display signal are applied to all the embodiments of the present specification.

The display signal selecting unit 32 is provided to select the first display signal or the second display signal according to a determination of the comparing unit 33.

The comparing unit 33 may be provided to compare the first recognition signal with respect to the object generated by the first recognition signal generating unit 2 with the display information, when the first recognition signal is the same as one of the display information, may allow the display signal generating unit 31 to generate the first display signal corresponding to the display information, and when the first recognition signal is not the same as the display information, may allow the display signal generating unit 31 to generate the second display signal.

The display driving unit 1 may include a display unit 11, a driving unit 12, and a drive determining unit 13.

The display unit 11 may include a protrusion unit described later and may be provided to represent a display by the protrusion unit.

The driving unit 12 may be electrically connected to the display unit 11. Specifically, the driving unit 12 may be electrically connected to the protrusion unit of the display unit 11 to drive the protrusion unit. Such a driving unit 12 may provide a driving force so that a protrusion of the protrusion unit repeatedly projects at a specific height, at a specific period, and/or in a specific pattern. To this end, various actuators may be used.

The drive determining unit 13 may be electrically connected to the driving unit 12 and may be provided to operate at least a part of the driving unit 12 in accordance with the display signal. The drive determining unit 13 may receive a display signal for operating the driving unit 12 from the first recognition signal generating unit 2 and/or the controller unit 3, and accordingly operate the driving unit 12 in accordance with the display signal.

According to the embodiment, when the first recognition signal generating unit 2 generates the first recognition signal based on the recognition of the object, the comparing unit 33 may compare the first recognition signal with the display information and determine whether to generate the first display signal or the second display signal. Accordingly, the display signal generating unit 31 may generate the first display signal and/or the second display signal, and the display signal selecting unit 32 may select the first display signal or the second display signal.

When the selected first display signal or second display signal is transmitted to the drive determining unit 13 of the display driving unit 1, the driving unit 12 may drive the protrusion unit to represent a display in accordance with the transmitted display signal.

Therefore, in the embodiment of the disclosure, the user may recognize a tactile display through a projection indication of the protrusion unit with respect to the recognized object. Furthermore, the projected indication may provide the user with a new visual display by protrusion.

Figure 3:
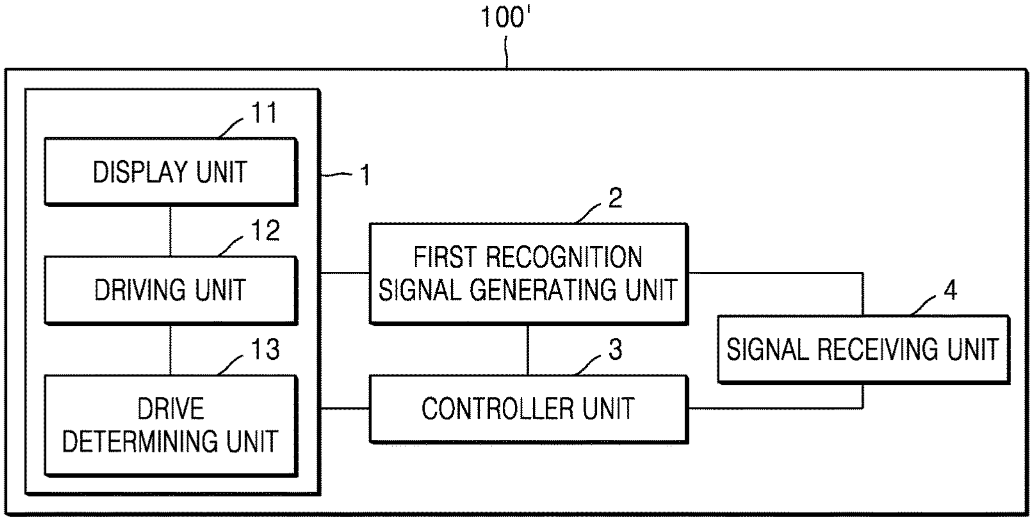
FIG. 3 is a block diagram showing a configuration of an electronic display device according to another embodiment.

FIG. 3 is a block diagram showing a configuration of an electronic display device 100' according to another embodiment. In the embodiment shown in FIG. 3, the same elements as those in the embodiment shown in FIG. 1 will not be described in detail.

The embodiment shown in FIG. 3 may further include a signal receiving unit 4 electrically connected to the first recognition signal generating unit 2 and/or the controller unit 3 in addition to the embodiment shown in FIG. 1.

The signal receiving unit 4 may receive a second recognition signal transmitted from an object.

To this end, the object may be provided to generate and transmit the second recognition signal. For example, the object may include a radio frequency identification (RFID) tag and/or a near field communication (NFC) tag to transmit the second recognition signal based on the RFID tag and/or the NFC tag.

At this time, the signal receiving unit 4 may include a RFID reader and/or a NFC reader.

The RFID reader may modulate a CW signal and transmit the CW signal to the RFID tag. The modulated CW signal may be transmitted to the RFID tag through a certain channel. The RFID tag may receive the modulated signal to acquire power, modulate the above-described information stored therein using the acquired power, transmit the second recognition signal including information about the object to the RFID reader. The RFID reader may receive the second recognition signal which is the modulated information and generate a first recognition signal corresponding to the second recognition signal.

The NFC tag may include a volatile and/or non-volatile memory and an IC chip including a NFC function. The NFC tag may be a device capable of transmitting data in a non-contact manner at a near distance within 10 cm using a specific frequency, for example, a frequency band of 13.56 MHz and may communicate by sensing a simple touch or proximity distance. Information corresponding to the second recognition signal may be stored in the volatile and/or nonvolatile memory included in the NFC tag.

As the signal receiving unit 4, when the NFC reader touches or is close to the NFC tag, a change occurs in a magnetic field, and a current is generated in the NFC tag by the change of the magnetic field, the second recognition signal corresponding to recognition information stored in the NFC tag is transmitted to the NFC reader so that the NFC reader may generate the first recognition signal.

According to the embodiment, since the first recognition signal capable of recognizing the object is generated based on the second recognition signal transmitted from the object, the information about the object stored in the object may be accurately grasped.

The description of the signal receiving unit 4 may be applied to all the other embodiments of the present specification.

Figure 4:
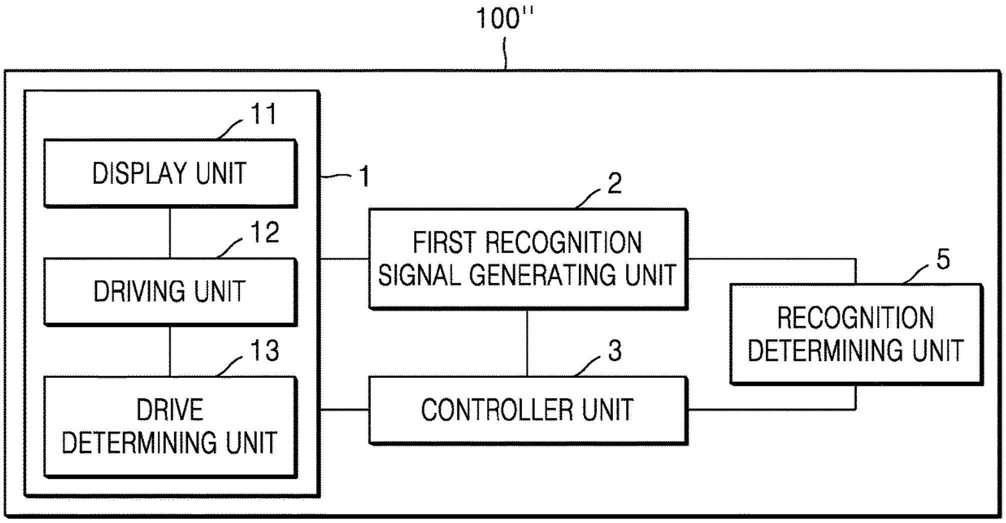
FIG. 4 is a block diagram showing a configuration of an electronic display device according to another embodiment.

FIG. 4 is a block diagram showing a configuration of an electronic display device 100" according to another embodiment. In the embodiment shown in FIG. 4, the same elements as those in the embodiment shown in FIG. 1 will not be described in detail.

The embodiment shown in FIG. 4 may further include a recognition determining unit 5 electrically connected to the first recognition signal generating unit 2 and/or the controller unit 3 in addition to the embodiment shown in FIG. 1.

The recognition determining unit 5 may be provided to allow the first recognition signal generating unit 2 to perform a recognition operation on the object. The recognition determining unit 5 may include a switch module. A user may adjust an operation of the first recognition signal generating unit 2 by operating the switch module. Alternatively, the recognition determining unit 5 may include various sensor units. When external and/or internal conditions satisfy or do not satisfy preset conditions, the recognition determining unit 5 may allow the first recognition signal generating unit 2 to perform the recognition operation on the object.

With the above-described recognition determining unit 5, the electronic display device 100" may manually or automatically recognize the object.

The description of the recognition determining unit 5 may be applied to all other embodiments of the present specification.

Figure 5:
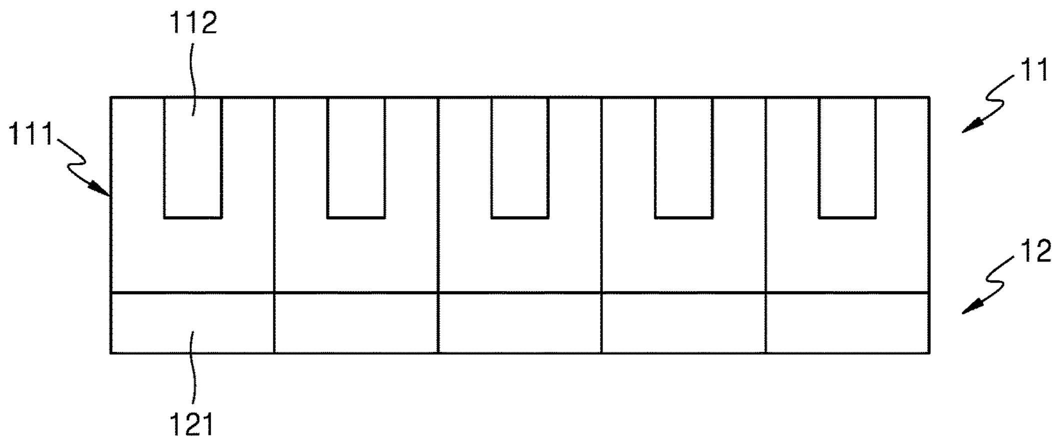
FIG. 5 is a block diagram schematically showing a configuration of a display unit according to an embodiment.

Meanwhile, the display unit 11 may include a protrusion unit 111, as shown in FIG. 5. At least one protrusion unit 111 may be provided. The protrusion unit 111 may include at least one protrusion 112.

In the embodiment shown in FIG. 5, the display unit 11 may have a plurality of protrusion units 111 separated from each other and each of the protrusion units 111 may have one protrusion 112. However, the disclosure is not necessarily limited thereto. A single protrusion unit 111 may be provided to have a plurality of protrusions 112 separated from each other. This may be applied to all embodiments of the present specification.

The driving unit 12 may include a driving module 121 that linearly reciprocates the protrusions 112 in up and down directions of FIG. 5 and may be provided such that one driving module 121 is connected to one protrusion 112 as shown in FIG. 5. However, the disclosure is not necessarily limited thereto. Although not shown in the drawing, the driving unit 12 may be provided such that a plurality of protrusions may be connected to one driving module to perform the same operation. In this way, a plurality of protrusions and a plurality of sets of one driving module connected to the plurality of protrusions may be present. This may be applied to all embodiments of the present specification.

Figure 6:
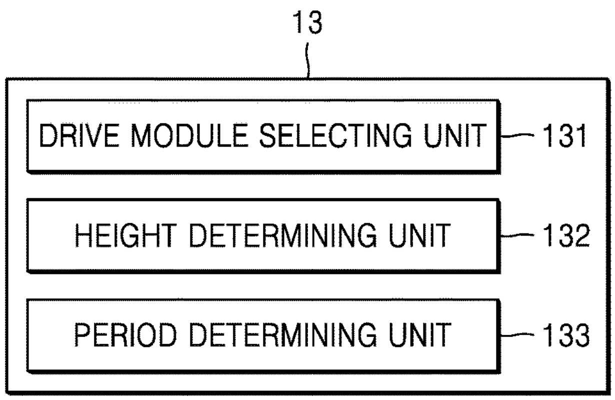
FIG. 6 is a block diagram schematically showing a drive determining unit according to an embodiment.

FIG. 6 is a block diagram schematically showing the drive determining unit 13 according to an embodiment.

Referring to FIG. 6, the drive determining unit 13 according to an embodiment may include a drive module selecting unit 131, a height determining unit 132, and/or a period determining unit 133.

When the protrusion unit 111 has the plurality of protrusions 112 and a driving unit has the plurality of driving modules 121 individually connected to at least one of the protrusions 112, the drive module selecting unit 131 may be provided to operate at least some of the plurality of driving modules 121. Accordingly, at least one protrusion 112 connected to the selected driving module 121 may operate and the protrusion 112 connected to the unselected driving module 121 may not operate. Therefore, a user may perceive display information of various patterns displayed by driving of some and/or all protrusions tactually and/or visually.

The height determining unit 132 may be provided to determine a height at which the protrusion 112 projects. That is, the height determining unit 132 may control a driving degree of the driving module 121 to determine the height at which the protrusion 112 projects. Accordingly, even when one protrusion 112 is provided, it is possible to display information distinguished in a plurality of cases, such as a case where the protrusion 112 completely projects, a case where only the protrusion 112 partially projects, and a case where the protrusion 112 does not project.

The period determining unit 133 may be provided to determine a projection period of the at least one protrusion 112. That is, the period determining unit 133 may determine the projection period of the protrusion 112 by controlling a driving period of the driving module 121. Accordingly, even when one protrusion 112 is provided, it is possible to provide information distinguished in a plurality of cases by adjusting the projection period and projecting the protrusion 112 in a plurality of patterns.

In the embodiment shown in FIG. 6, the drive determining unit 13 may include all the drive module selecting unit 131, the height determining unit 132, and the period determining unit 133 to display information by protrusion by applying the drive module selecting unit 131, the height determining unit 132, and the period determining unit 133 in combination. However, the disclosure is not necessarily limited thereto. The drive determining unit 13 may include at least one of the drive module selecting unit 131, the height determining unit 132, and the period determining unit 133.

The embodiments of the drive determining unit 13 as described above may be applied to all the embodiments of the present specification.

Next, an embodiment of an information display method of an electronic display device according to the embodiments of the disclosure as described above will be described.

Figure 7:
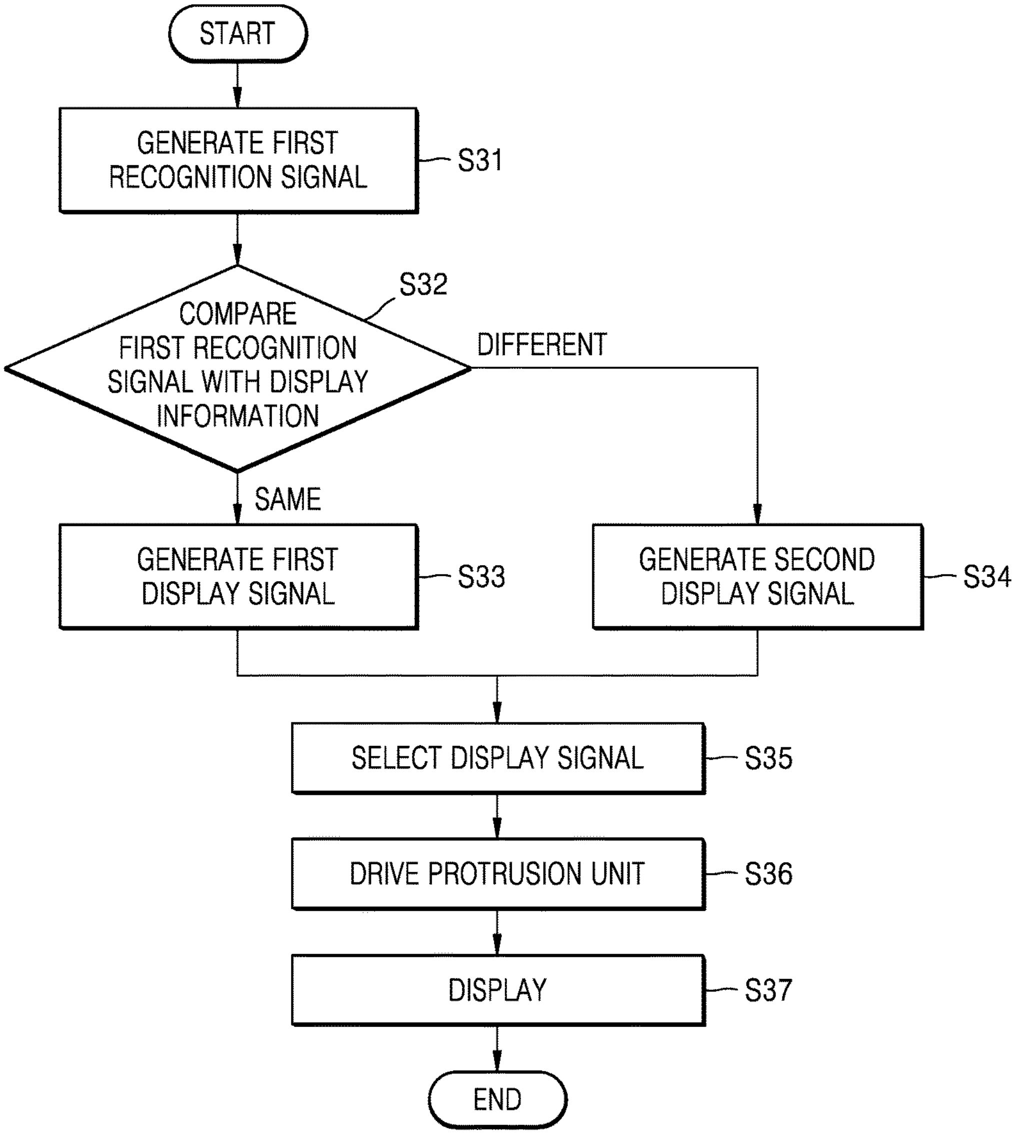
FIG. 7 is a flowchart illustrating an information display method of an electronic display device according to an embodiment.

FIG. 7 is a flowchart illustrating an information display method of an electronic display device according to an embodiment.

First, a first recognition signal with respect to an object may be generated by the first recognition signal generating unit 2 as shown in FIG. 1 (S31).

The comparing unit 33 of the controller unit 3 may compare the first recognition signal with display information stored in the storage unit 34 (S32).

At this time, the comparing unit 33 may allow the display signal selecting unit 32 to generate a first display signal corresponding to the display information when the first recognition signal is the same as one of the display information (S33) and may allow the display signal selecting unit 32 to generate the second display signal when the first recognition signal is different with the display information (S34).

Next, the display signal selecting unit 32 may select the first display signal or the second display signal (S35), and the drive determining unit 13 may operate the driving module 121 of the driving unit 12 in accordance with the selected first display signal or second display signal to drive the protrusion 112 of the protrusion unit 111 (S36). Information corresponding to the first display signal or the second display signal may be displayed by driving the protrusion unit 111 (S37).

Accordingly, a user may recognize the object using the electronic display device according to the embodiment of the disclosure, when the recognized information is the same as previously stored information, may be tactually and/or visually provided with a display corresponding to the first display signal, and when the recognized information is not the same as the previously stored information, may be tactually and/or visually provided with a display corresponding to the second display signal that is information that the recognized information is not the previously stored information in which the object is recognized. Alternatively, since the information about the recognized object is not the same as the previously stored display information, the second display signal may be a display signal corresponding to the first recognition signal indicating new information about the object, and accordingly, the new information, other than the stored information about the object, may be tactually and/or visually provided to the user.

Figure 8:
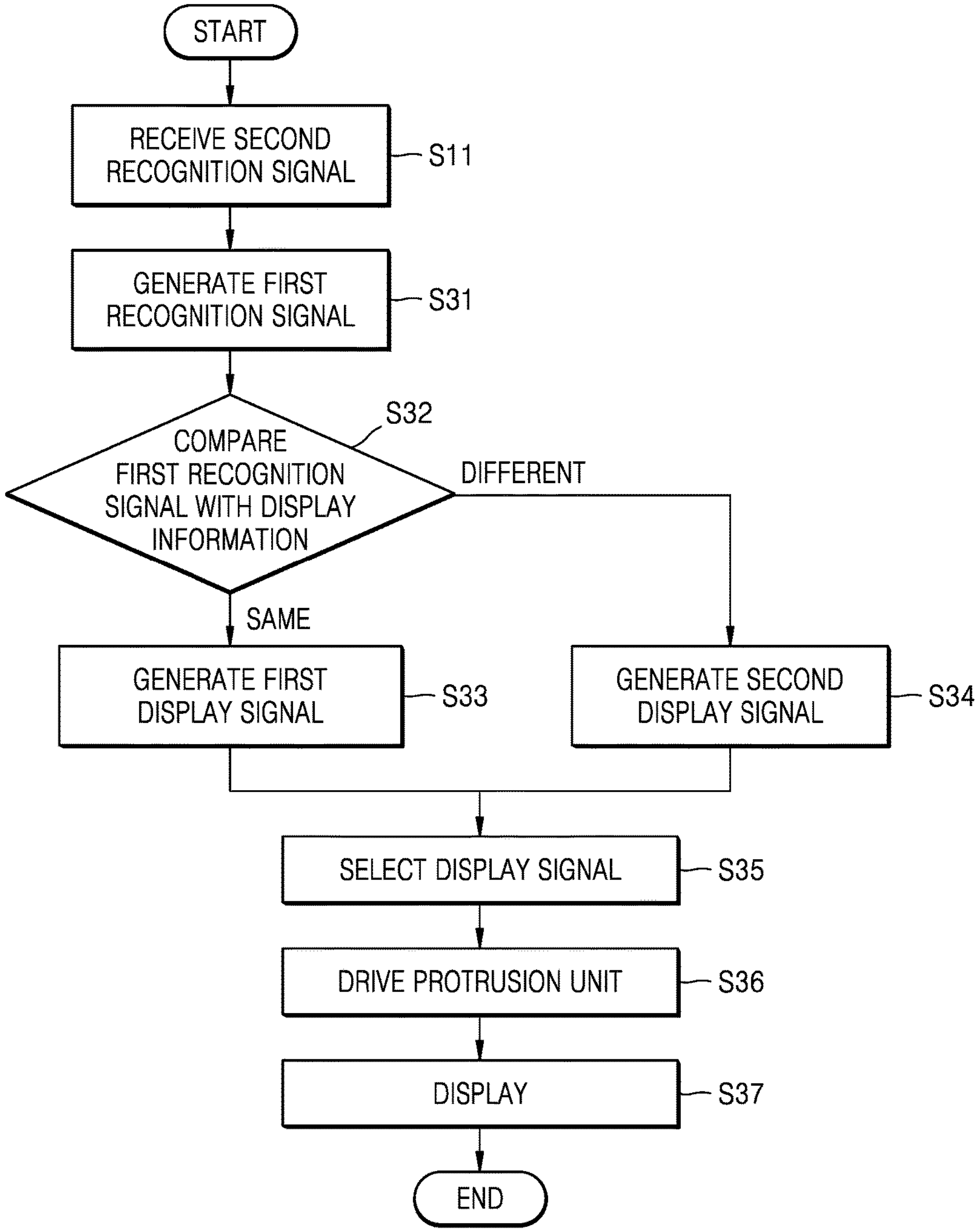
FIG. 8 is a flowchart sequentially showing an information display method of an electronic display device according to another embodiment.

FIG. 8 is a flowchart sequentially showing an information display method of an electronic display device according to another embodiment. In the embodiment shown in FIG. 8, the same operations as those of the embodiment shown in FIG. 7 will not be described in detail.

The embodiment shown in FIG. 8 may further include an operation S11 of receiving a second recognition signal in addition to the embodiment shown in FIG. 7. This may be performed by the signal receiving unit 4 as in the embodiment shown in FIG. 3.

To this end, an object may be provided to generate and transmit the second recognition signal. For example, the object may include a RFID tag and/or a NFC tag to transmit the second recognition signal based on the RFID tag and/or the NFC tag, and the signal receiving unit 4 may include a RFID reader and/or a NFC reader.

According to the embodiment, since a first recognition signal capable of recognizing the object is generated based on the second recognition signal transmitted from the object in accordance with the second recognition signal, information about the object stored in the object may be accurately grasped.

The description of operation S11 of receiving the second recognition signal may be applied to all the other embodiments of the present specification.

Figure 9:
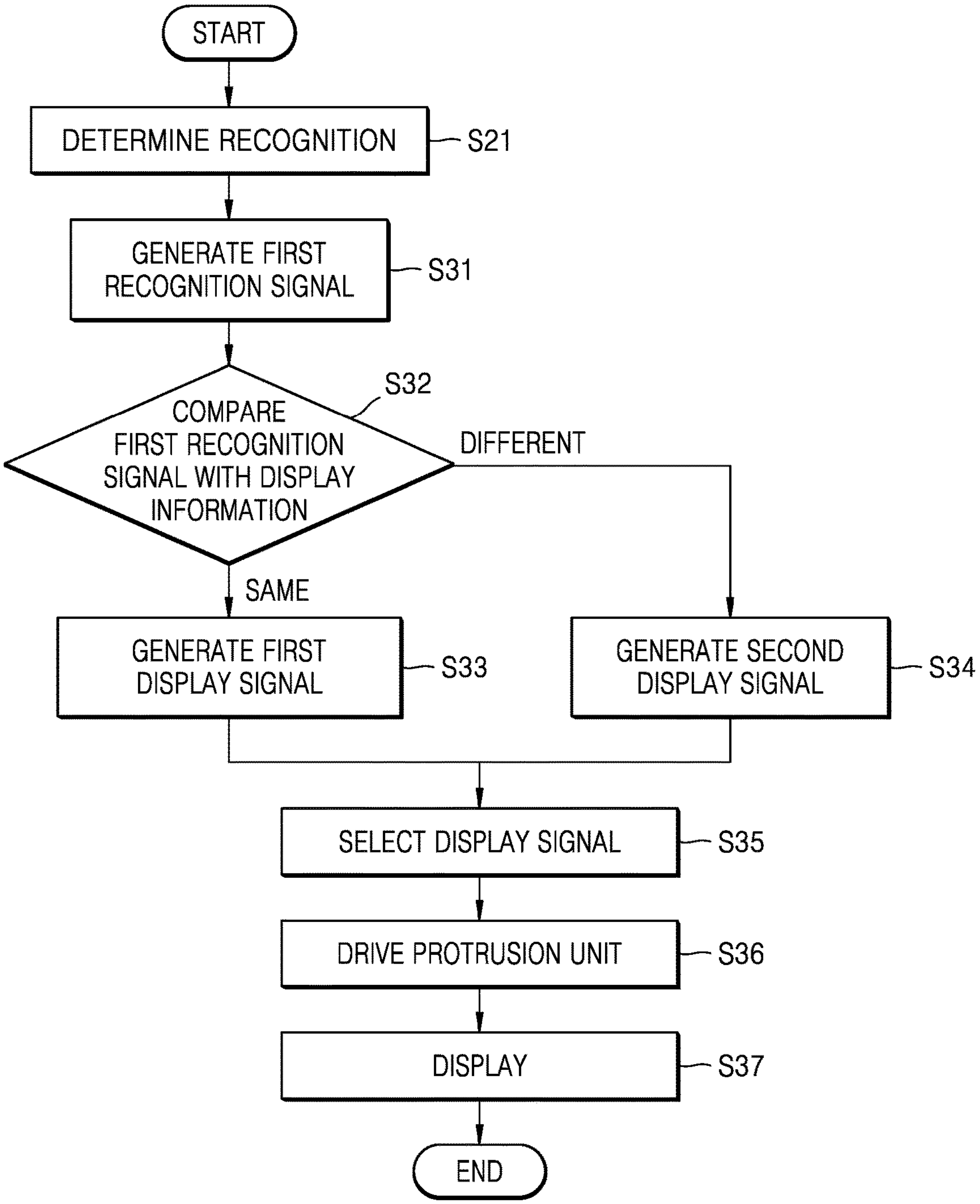
FIG. 9 is a flowchart sequentially showing an information display method of an electronic display device according to another embodiment.

FIG. 9 is a flowchart sequentially showing an information display method of an electronic display device according to another embodiment. In the embodiment shown in FIG. 9, the same operations as those of the embodiment shown in FIG. 7 will not be described in detail.

The embodiment shown in FIG. 9 may further include a recognition determining operation S21 in addition to the embodiment shown in FIG. 7. The recognition determining operation S21 may be an operation in which the recognition determining unit 5 allows the first recognition signal generating unit 2 to determine and perform a recognition operation on an object as shown in FIG. 4.

Accordingly, a user may manually control an operation of the first recognition signal generating unit 2. Alternatively, when external and/or internal conditions satisfy or do not satisfy preset conditions by the recognition determining unit 5, the recognition determining unit 5 may allow the first recognition signal generating unit 2 to perform the recognition operation on the object.

The description of the recognition determining operation S21 may be applied to all other embodiments of the present specification.

Figure 10:
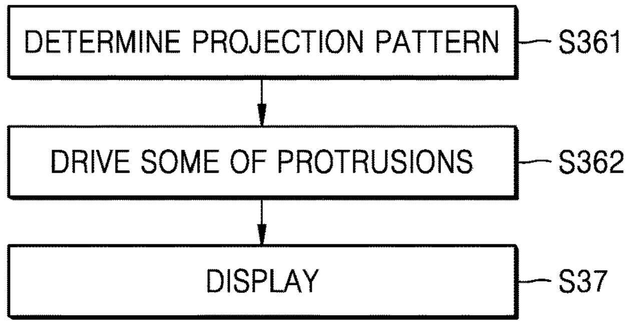
FIG. 10 is a flowchart showing more specifically an embodiment of a protrusion unit driving operation.

FIG. 10 is a flowchart showing more specifically an embodiment of the protrusion unit driving operation S36.

As shown in FIG. 5, when the protrusion unit 111 has the plurality of protrusions 112 and a driving unit has the plurality of driving modules 121 individually connected to at least one of the protrusions 112, the driving module selecting unit 131 shown in FIG. 6 may determine a protrusion pattern (S361). The protrusion pattern may be determined by selecting which of the plurality of driving modules 121 to operate. Thereafter, the drive module selecting unit 131 may select and operate at least some of the driving modules 121 so that at least one protrusion 112 connected to the selected driving modules 121 operate, and the protrusions 112 connected to the unselected driving modules 121 do not operate (S362). Therefore, a user may tactually and/or visually perceive display information of various patterns displayed by the driving of some and/or all protrusions.

Figure 11:
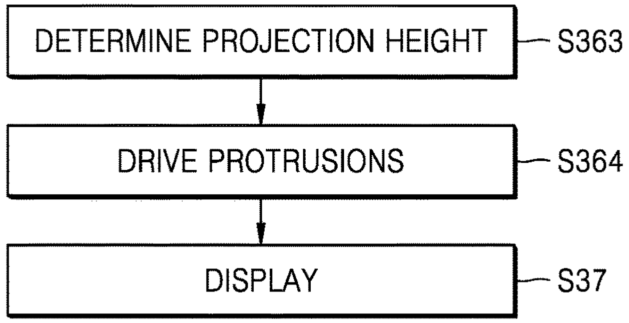
FIG. 11 is a flowchart more specifically showing another embodiment of a protrusion unit driving operation.

FIG. 11 is a flowchart more specifically showing another embodiment of the protrusion unit driving operation S36.

The height determining unit 132 shown in FIG. 6 may determine a projection height of at least one protrusion (S363). That is, the height determining unit 132 may determine a projection height of the protrusion 112 by controlling a driving degree of the driving module 121. Thereafter, the height determining unit 132 may allow the driving module 121 to operate so that the protrusion 112 is driven at the determined height (S364). Accordingly, even when one protrusion 112 is provided, it is possible to display information distinguished in a plurality of cases, such as a case where the protrusion 112 completely projects, a case where only the protrusion 112 partially projects, and a case where the protrusion 112 does not project.

Figure 12:
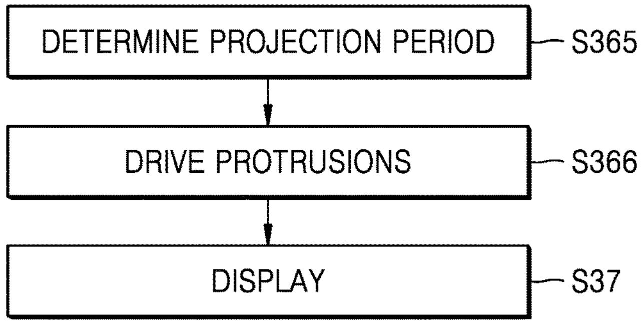
FIG. 12 is a flowchart more specifically showing still another embodiment of a protrusion unit driving operation.

FIG. 12 is a flowchart more specifically showing still another embodiment of the protrusion unit driving operation S36.

The period determining unit 133 shown in FIG. 6 may determine a projection period of the at least one protrusion 112 (S365). That is, the period determining unit 133 may determine the projection period of the protrusion 112 by controlling a driving degree of the driving module 121. Thereafter, the period determining unit 133 may allow the driving module 121 to operate so that the protrusion 112 is driven at the determined period (S366). Accordingly, even when one protrusion 112 is provided, it is possible to provide information distinguished in a plurality of cases by adjusting the projection period and projecting the protrusion 112 in a plurality of patterns.

The disclosure has been described above with reference to the preferred embodiments. It will be understood by those skilled in the art that the disclosure may be embodied in various other forms without departing from the spirit or essential characteristics thereof. Therefore, the above-described embodiments should be considered in an illustrative rather than a restrictive sense. The scope of the disclosure is defined by the appended claims rather than by the foregoing description, and all differences within the scope of equivalents thereof should be construed as being included in the disclosure.

The invention claimed is:

1. An electronic display device comprising:

a first recognition signal generating unit configured to generate a first recognition signal with respect to an object;

a storage unit configured to store a plurality of display information;

a display signal generating unit configured to generate a first display signal corresponding to each of the plurality of display information and a second display signal different from the first display signal;

a comparing unit configured to compare the first recognition signal with the plurality of display information, and when the first recognition signal is same as one of the plurality of display information, to allow the display signal generating unit to generate the first display signal corresponding to each of the plurality of display information, and when the first recognition signal is not same as the plurality of display information, to allow the display signal generating unit to generate the second display signal;

a display signal selecting unit configured to select the first display signal or the second display signal;

a display unit comprising a protrusion unit and configured to generate a display via the protrusion unit in accordance with the first display signal or the second display signal;

a driving unit connected to the protrusion unit and configured to drive the protrusion unit; and a drive determining unit electrically connected to the driving unit and configured to operate at least a part of the driving unit in accordance with the first display signal or the second display signal, wherein the protrusion unit comprises at least one protrusion, wherein the driving unit comprises at least one driving module connected to the at least one protrusion, and wherein the drive determining unit further comprises a height determining unit configured to determine a projection height of the at least one protrusion.

2. The electronic display device of claim 1, further comprising:

a signal receiving unit electrically connected to the first recognition signal generating unit and configured to receive a second recognition signal transmitted from the object.

3. The electronic display device of claim 2, wherein the first recognition signal generating unit is configured to generate the first recognition signal corresponding to the second recognition signal.

4. The electronic display device of claim 1, wherein the second display signal is a new display signal corresponding to the first recognition signal which is not same as the plurality of display information.

5. The electronic display device of claim 1, further comprising:

a recognition determining unit electrically connected to the first recognition signal generating unit and configured to allow the first recognition signal generating unit to perform a recognition operation on the object.

6. The electronic display device of claim 1, wherein the protrusion unit comprises a plurality of protrusions separated from each other, wherein the driving unit comprises a plurality of driving modules individually connected to at least one of the plurality of protrusions, and wherein the drive determining unit further comprises a drive module selecting unit configured to operate at least one of the plurality of driving modules.

7. The electronic display device of claim 1, wherein the drive determining unit further comprises a period determining unit configured to determine a projection period of the at least one protrusion.

8. An information display method performed by an electronic display device, the information display method comprising:

generating a first recognition signal with respect to an object;

comparing the first recognition signal with a plurality of display information;

when the first recognition signal is same as one of the plurality of display information, generating a first display signal corresponding to the plurality of display information, and when the first recognition signal is not same as the plurality of display information, generating a second display signal different from the first display signal;

selecting the first display signal or the second display signal; and generating a display by driving a protrusion unit in accordance with the first display signal or the second display signal, wherein the protrusion unit comprises at least one protrusion, wherein the display by the protrusion unit is determined according to a projection height of the at least one protrusion.

9. The information display method of claim 8, further comprising: receiving a second recognition signal transmitted from the object.

10. The information display method of claim 9, wherein the generating of the first recognition signal comprises:

generating the first recognition signal corresponding to the second recognition signal.

11. The information display method of claim 8, wherein the second display signal is a new display signal corresponding to the first recognition signal which is not same as the plurality of display information.

12. The information display method of claim 8, further comprising:

a recognition determining to perform a recognition operation on the object.

13. The information display method of claim 8, wherein the protrusion unit comprises a plurality of protrusions separated from each other, and wherein the display by the protrusion unit is determined according to projection patterns of the plurality of protrusions.

14. The information display method of claim 8, wherein the display by the protrusion unit is determined according to a projection period of the at least one protrusion.

* * * * *